United States Patent Office 2,774,762
Patented Dec. 18, 1956

2,774,762

DIHYDROISOCODEINE

Manuel M. Baizer, Flushing, N. Y., assignor to New York Quinine and Chemical Works Incorporated, Brooklyn, N. Y., a corporation of New York No Drawing. Application October 18, 1950,
Serial No. 190,873

2 Claims. (Cl. 260—285)

My invention relates to the manufacture of dihydroisocodeine from dihydrocodeine. For convenience, dihydroisocodeine is hereinafter referred to as DHIC.

DHIC has previously been made by a process which involves converting codeine to alpha-chlorocodide (Small and Cohen, J. A. C. S. 52, 2214, 1931) and treating the latter with alkali which gives a mixture of pseudocodeine, allopseudocodeine and isocodeine. The mixture is separated into its components by means of appropriate salts, and the isocodeine is then hydrogenated and yields DHIC (Speyer and Krauss, Ann. 432, 233, 1923).

The overall yield of this method is only 22.3% of the theory based on codeine. In another experiment (Rapoport and Payne, J. Org. Chem. 15, 1097, 1950) the overall yield obtained by the same method was only 6%.

In an effort to improve the yield, I have now discovered that a far superior yield of DHIC in the order of 65–70% based on codeine can be obtained by a procedure which is very different from the one referred to above.

My new process involves the epimerization of dihydrocodeine by means of the aluminum salt of an alcohol capable of being oxidized to its carbonyl derivative. A trace of a hydrogen acceptor such as cyclohexanone may be added to the reaction mixture.

I have found that, as far as I can determine, the DHIC obtained by my method is not admixed with any significant quantity of its epimer, dihydrocodeine; the crude dihydroisocodeine of my process yields derivatives such as the picrate and methiodide whose melting points are in good agreement with those reported in the literature, as shown in my appended example.

DHIC has been extensively investigated clinically as an analgesic and antitussive agent, and also with reference to its addiction liability. Whereas DHIC is rather expensive when made by the method of the prior art, it is produced by my new method in a much less expensive and more convenient manner, since the yield is greatly improved and no extensive separation and purification of the DHIC is required. Thus, DHIC will now be readily available for use in clinical trials.

The following example illustrates my invention:

Example

A mixture of 5.00 g. anhydrous dihydrocodeine, 7.50 g. aluminum isopropoxide and 150 ml. dry toluene was heated under reflux, with protection against the advent of moisture, for 24 hours. The mixture was cooled and extracted with 100+2×25 cc. of 5% sulfuric acid. The acid extracts were chilled. Forty percent potassium hydroxide was added, the mixture diluted somewhat with water, and the liberated alkaloid was extracted by three 100 cc. portions of chloroform. The chloroform extracts were washed with water and then evaporated to dryness. The residue was crystalline and weighed 3.38 g. (67.7% based on dihydrocodeine).

A sample of the crude alkaloid was converted to its picrate in the usual manner, M. P. 235° C. A mixture of 75 parts of authentic dihydrocodeine picrate and 25 parts of authentic dihydroisocodeine picrate melted at 226–227° C. Another sample was converted to its methiodide which after recrystallization melted at 269° C. with decomposition. A third sample of the alkaloid was dissolved in acid and reprecipitated with alkali; after recrystallization from alcohol the alkaloid melted at 200° C. and gave no depression in melting point with a sample of authentic dihydroisocodeine.

These melting points are in good agreement with those given in Small's "Chemistry of the Opium Alkaloids," published by the U. S. Treasury Department, Public Health Service, Supplement No. 103, page 224.

The solvent employed in this reaction is an anhydrous organic liquid selected primarily for its ability to dissolve substantial amounts of the aluminum salt of an alcohol capable of being oxidized to its carbonyl derivative, such as benzene and toluene. The reaction is conveniently performed at reflux temperature of the solvent and proceeds to completion within a reasonable period of time. The reaction conditions such as temperature, duration, relative proportions of the reactants and of the solvent, can be modified in various ways to strengthen the efficiency of the process and further increase the yields. These modifications can readily be worked out and are intended to be included in the scope of this invention and of the appended claims.

What I claim is:

1. In the manufacture of dihydroisocodeine the step which comprises causing dihydrocodeine to react in toluene with aluminumisopropoxide.

2. The process of making dihydroisocodeine which comprises heating a mixture of 5.00 g. anhydrous dihydrocodeine, 7.50 g. aluminum isopropoxide and 150 ml. of dry toluene under reflux with exclusion of moisture, cooling the reaction mixture, extracting it with 5% sulfuric acid, rendering the chilled acid extracts alkaline, extracting the liberated dihydroisocodeine therefrom with chloroform and evaporating the chloroform extract to dryness.

References Cited in the file of this patent

Houben: "Die Methoden der organischen Chemie," vol. II, page 589 (1943).